(12) United States Patent
Barkan et al.

(10) Patent No.: US 8,537,005 B2
(45) Date of Patent: Sep. 17, 2013

(54) POINT-OF-TRANSACTION CHECKOUT SYSTEM WITH ZERO-FOOTPRINT CORDLESS ELECTRO-OPTICAL READER

(75) Inventors: Edward Barkan, Miller Place, NY (US); John Britts, Port Jefferson Station, NY (US); Christopher Warren Brock, Manorville, NY (US); Mark Drzymala, Commack, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 399 days.

(21) Appl. No.: 12/834,288

(22) Filed: Jul. 12, 2010

(65) Prior Publication Data

US 2012/0007738 A1    Jan. 12, 2012

(51) Int. Cl.
*G08B 21/00*    (2006.01)

(52) U.S. Cl.
USPC .......... 340/540; 340/5.4; 340/5.41; 340/5.42; 235/375; 235/376

(58) Field of Classification Search
USPC .............. 340/5.1, 5.4, 5.41, 5.42, 540, 568.1; 235/375–381
See application file for complete search history.

(56) References Cited

U.S. PATENT DOCUMENTS

| | | | |
|---|---|---|---|
| 4,613,895 A | 9/1986 | Burkey et al. | |
| 4,794,239 A | 12/1988 | Allais | |
| 5,059,779 A | 10/1991 | Krichever et al. | |
| 5,124,539 A | 6/1992 | Krichever et al. | |
| 5,189,291 A | 2/1993 | Siemiatkowski | |
| 5,200,599 A | 4/1993 | Krichever et al. | |
| 5,304,786 A | 4/1994 | Pavlidis et al. | |
| 5,314,631 A | 5/1994 | Katoh | |
| 5,703,349 A | 12/1997 | Meyerson et al. | |
| 5,883,373 A | 3/1999 | Swartz | |
| 6,330,973 B1 | 12/2001 | Bridgelall et al. | |
| 7,191,947 B2 | 3/2007 | Kahn et al. | |
| 7,191,950 B1 * | 3/2007 | Petrovich et al. | 235/472.02 |
| 7,546,953 B1 | 6/2009 | Collins, Jr. | |
| 7,562,817 B2 | 7/2009 | Latimer et al. | |
| 2002/0030094 A1 | 3/2002 | Curry et al. | |
| 2002/0077937 A1 * | 6/2002 | Lyons et al. | 705/28 |
| 2005/0077997 A1 * | 4/2005 | Landram et al. | 340/5.54 |

OTHER PUBLICATIONS

International Search Report and Written Opinion dated Mar. 15, 2011 in related case PCT/US2010/062622.

* cited by examiner

*Primary Examiner* — Wayne Young
*Assistant Examiner* — Mark Rushing
(74) *Attorney, Agent, or Firm* — Nong-Qiang Fan

(57) ABSTRACT

A checkout system employs a bi-optical workstation having dual windows and a main reader for electro-optically reading indicia on products to be processed at the workstation through at least one of the windows. The workstation is supported by a countertop and has a raised housing extending upwardly away from the countertop. An auxiliary cordless reader is used for electro-optically reading the indicia in a handheld mode when the main reader is not operated. A cradle bounds a compartment in which the auxiliary cordless reader is removably received when not in the handheld mode. The cradle is supported by the raised housing above and remote from, and out of direct contact with, the countertop to form a zero-footprint therewith.

14 Claims, 4 Drawing Sheets

POINT-OF-TRANSACTION CHECKOUT SYSTEM WITH ZERO-FOOTPRINT CORDLESS ELECTRO-OPTICAL READER

BACKGROUND OF THE INVENTION

In the retail industry, flat bed, laser-based readers, also known as horizontal slot scanners, have been used to electro-optically read one-dimensional bar code symbols, particularly of the Universal Product Code (UPC) type, at point-of-transaction checkout systems in supermarkets, warehouse clubs, department stores, and other kinds of retailers for many years. As exemplified by U.S. Pat. No. 5,059,779; No. 5,124,539 and No. 5,200,599, a single, horizontal window is set flush with, and built into, a horizontal countertop of the system. Products to be purchased bear identifying symbols and are typically slid by a clerk across the horizontal window through which a multitude of scan lines is projected in a generally upwards direction. When at least one of the scan lines sweeps over a symbol associated with a product, the symbol is processed and read. The multitude of scan lines is typically generated by a scan pattern generator which includes a laser for emitting a laser beam at a mirrored component mounted on a shaft for rotation by a motor about an axis. A plurality of stationary mirrors is arranged about the axis. As the mirrored component turns, the laser beam is successively reflected onto the stationary mirrors for reflection therefrom through the horizontal window as a scan pattern of the scan lines.

It is also known to provide a checkout system not only with a generally horizontal window, but also with an upright or generally vertical window that faces the clerk at the system. The upright window is oriented generally perpendicularly to the horizontal window, or is slightly rearwardly or forwardly inclined. The laser scan pattern generator within this dual window or bi-optical terminal or workstation also projects the multitude of scan lines in a generally outward direction through the upright window toward the clerk. The generator for the upright window can be the same as, or different from, the generator for the horizontal window. The clerk slides the products past either window, e.g., from right to left, or from left to right, or diagonally, in a "swipe" mode. Alternatively, the clerk merely presents the symbol on the product to a central region of either window in a "presentation" mode. The choice depends on clerk preference or on the layout of the system.

Sometimes, the upright window is not built into the system as a permanent installation. Instead, a vertical slot scanner is configured as a portable reader that is placed on the countertop of an existing horizontal slot scanner in a hands-free mode of operation. In the frequent event that large, heavy, or bulky products, which cannot easily be brought to the reader, have symbols that are required to be read, then the clerk may also manually grasp the portable reader and lift it off, and remove it from, the countertop for reading the symbols in a handheld mode of operation.

As advantageous as these laser-based, point-of-transaction systems have been in processing transactions involving products associated with one-dimensional symbols, each having a row of bars and spaces spaced apart along one direction, these systems cannot process stacked symbols, such as Code 49 that introduced the concept of vertically stacking a plurality of rows of bar and space patterns in a single symbol, as described in U.S. Pat. No. 4,794,239, or two-dimensional symbols, such as PDF417 that increased the amount of data that could be represented or stored on a given amount of surface area, as described in U.S. Pat. No. 5,304,786. Both one- and two-dimensional symbols, as well as stacked symbols, can be read by employing imaging readers each having a solid-state imager which has a one- or two-dimensional array of cells or photosensors that correspond to image elements or pixels in a field of view of the imager. Such an imager may include a one- or two-dimensional charge coupled device (CCD) or a complementary metal oxide semiconductor (CMOS) device, as well as associated circuits for producing electronic signals corresponding to the one- or two-dimensional array of pixel information over the field of view.

It is therefore known to use a solid-state imager for capturing a monochrome image of a symbol as, for example, disclosed in U.S. Pat. No. 5,703,349. It is also known to use a solid-state imager with multiple buried channels for capturing a full color image of a target as, for example, disclosed in U.S. Pat. No. 4,613,895. It is common to provide a two-dimensional CCD with a 640×480 resolution commonly found in VGA monitors, although other resolution sizes are possible.

It is also known to install the solid-state imager, analogous to that conventionally used in a consumer digital camera, in a bi-optical, point-of-transaction workstation, as disclosed in U.S. Pat. No. 7,191,947, in which the dual use of both the solid-state imager and the laser scan pattern generator in the same workstation is disclosed. It is possible to replace all of the laser scan pattern generators with solid-state imagers in order to improve reliability and to enable the reading of two-dimensional and stacked symbols, as well as the imaging of other targets, such as signatures, driver's licenses, receipts, etc.

As advantageous as the known laser- and/or imager-based, bi-optical workstations have been in processing products, the workstations are often accompanied by auxiliary electro-optical readers, either laser-based or imager-based, operated in a handheld mode to facilitate reading of large, heavy or bulky items that cannot be readily lifted into position facing at least one of the windows of a respective workstation. In general, a corded reader is used, and its cord or cable is plugged directly into an auxiliary reader port on the workstation. The corded reader when not held in one's hand can be supported in a convenience stand mounted on the countertop at which the workstation is mounted, or can be placed directly on the countertop. However, the corded reader's cable typically gets in the way of the handling of the products to be processed at the workstation, and the cable must often be repeatedly pushed out of the way after each time the corded reader is used. In addition, should the corded reader or its cable become damaged, the workstation must be removed from the countertop to enable unplugging of the corded reader for repair or replacement.

To alleviate part of this problem caused by the presence of the cable, a cordless reader can be operated in a handheld mode. The cordless reader is typically supported in a hands-free mode by a base station mounted on the countertop. When in the base station, the cordless reader's on-board batteries are electrically recharged by an external power supply connected to the base station. The base station also may contain a wireless transceiver with which an on-board wireless transceiver in the cordless reader communicates when a symbol on a product is read, as well as interface circuitry compatible with the auxiliary reader port on the workstation.

Although this cordless arrangement avoids the problem with the reader's cable being in the way and possibly becoming damaged, the base station/cordless reader combination is expensive, requires an external power supply and interface circuitry, and occupies a relatively large of space, or large footprint, on the countertop, often already crowded with other products and equipment, such as a cash register, a credit/debit card reader, a receipt printer, a keyboard, a display, a scale, bagging items, etc. In fact, some countertops, especially in small convenience stores, are so small to begin with that it is difficult to find a free place to position the base station, where the base station won't physically interfere with the operation of the workstation, and which is still convenient for the operator to reach when the cordless reader is needed.

Accordingly, a solution is needed that eliminates the inconvenience and minimizes the expense of a cordless reader, that eliminates the external power supply, and that reduces the size of the footprint on the countertop as compared to that of a conventional cordless reader with a base station. An additional problem that requires a solution is that the known cordless readers can easily become lost or stolen, or their batteries can be discharged during a work shift if their users neglect to replace them back on their respective/base stations. A means of assuring that the cordless reader is always returned to its base station when not in use is thus needed.

SUMMARY OF THE INVENTION

This invention generally relates to a checkout system and method in which a workstation is supported by a support surface, such as a countertop of a checkout stand, and is operative for processing products bearing indicia, typically one- or two-dimensional bar code symbols. The indicia can be printed on the products, or can be displayed on screens of such products as cellular telephones. The workstation may be a vertical slot scanner, as described above, or, preferably, is a bi-optical workstation having dual windows, typically a generally horizontal window and a generally upright window. In either case, the workstation includes a generally upright or raised housing extending upwardly away from the countertop, and a main reader supported by the workstation for electro-optically reading the indicia through at least one of the windows. The main reader can be laser- and/or imager-based, as described above.

The main reader advantageously includes a plurality of imaging readers that operate by image capture, each imaging reader including a solid-state imager for capturing return light from the indicia through at least one of the windows. Each imager preferably comprises a two-dimensional, charge coupled device (CCD) array or a complementary metal oxide semiconductor (CMOS) array. Each imager includes an illuminator for illuminating the indicia with illumination light from one or more illumination light sources, e.g., one or more light emitting diodes (LEDs). A controller, e.g., a microprocessor, is operative for controlling each illuminator to illuminate the indicia, for controlling each imager to capture the illumination light returning from the indicia over an exposure time period to produce electrical signals indicative of the indicia being read, and for processing the electrical signals to read the indicia. Each illuminator is only operative during the exposure time period. Each imager is controlled to capture the light from the indicia during different exposure time periods to avoid mutual interference among the illuminators.

The checkout system further comprises an auxiliary cordless reader for electro-optically reading the indicia in a handheld mode when the main reader is not operated to read the indicia. As described above, the auxiliary cordless reader is employed to facilitate reading of large, heavy or bulky items that cannot be readily lifted into position facing at least one of the windows of the workstation. The auxiliary cordless reader can be laser-based or imager-based, as described above.

One feature of this invention resides, briefly stated, in a cradle that bounds a compartment in which the auxiliary cordless reader is removably received when not in the handheld mode. The cradle is supported by the raised housing above and remote from, and out of direct contact with, the support surface to form a zero-footprint therewith. Thus, the size of the footprint on the countertop has been reduced to zero, which compares favorably to the relatively large footprint occupied by a conventional cordless reader with a base station resting on the countertop.

In the preferred embodiment, the raised housing has a front wall surrounding the window, and a side wall at a side of the workstation. The cradle does not extend forwardly of the front wall, or at least not to any appreciable extent, to prevent physical interference with products passing through the workstation. The cradle has an open end opening onto the front wall to facilitate ready insertion of the auxiliary cordless reader into the cradle, as well as ready removal of the auxiliary cordless reader from the cradle. The cradle is integrally formed with the side wall, and is preferably injection-molded to be of one-piece construction therewith. The cradle is inclined on the side wall and has a weep hole on the cradle for fluid drainage located at a lowest elevation relative to the countertop.

The auxiliary cordless reader electrically communicates with the workstation through the side wall via multiple electrical contacts that mate with corresponding multiple electrical contacts in the cradle. For example, the auxiliary cordless reader has an internal rechargeable battery and an electrical recharging contact for connection to a mating electrical recharging contact in the cradle when the auxiliary cordless reader is received in the compartment. The workstation has a power supply inside the workstation for recharging the battery in the auxiliary cordless reader via the recharging contacts. Hence, an external power supply, as described above in connection with the known base station, is not needed.

The auxiliary cordless reader also includes a sensor contact for connection to a mating sensor contact in the cradle when the auxiliary cordless reader is received in the compartment. The workstation has a controller inside the workstation for detecting the auxiliary cordless reader in the cradle via the sensor contacts, for disabling the main reader when the auxiliary cordless reader is not in the cradle, and for not enabling the main reader until the auxiliary cordless reader is back in the cradle. Hence, this insures that the auxiliary cordless reader will be returned to the cradle.

The controller is further operative for generating an alarm if reading by the main reader is attempted without the auxiliary cordless reader being back in the cradle. This further insures that the auxiliary cordless reader will be returned to the cradle. The controller is further operative for generating an alarm if the auxiliary cordless reader is moved beyond a predetermined distance away from the workstation. This prevents unauthorized travel of the auxiliary cordless reader too far away from the workstation.

The auxiliary cordless reader also includes a data contact for connection to a mating data contact in the cradle when the auxiliary cordless reader is received in the compartment. The workstation has a controller inside the workstation for downloading data corresponding to the indicia read by the auxiliary cordless reader into a batch memory when the auxiliary cordless reader is in the cradle, and for decoding the downloaded data. This batch data download can be used instead of the wireless transceiver.

In accordance with another feature of this invention, the checkout method is performed by processing products bearing indicia through a workstation supported by a support surface, configuring the workstation with a window and a raised housing extending upwardly away from the support surface, electro-optically reading the indicia through the window by operating a main reader in the workstation, electro-optically reading the indicia when the main reader is not operated by operating an auxiliary cordless reader in a handheld mode, configuring a cradle to bound a compartment in which the auxiliary cordless reader is removably received when not in the handheld mode, and supporting the cradle by the raised housing above and remote from, and out of direct contact with, the support surface to form a zero-footprint therewith.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

DETAILED DESCRIPTION OF THE PREFERRED EMBODIMENTS

Figure 1:
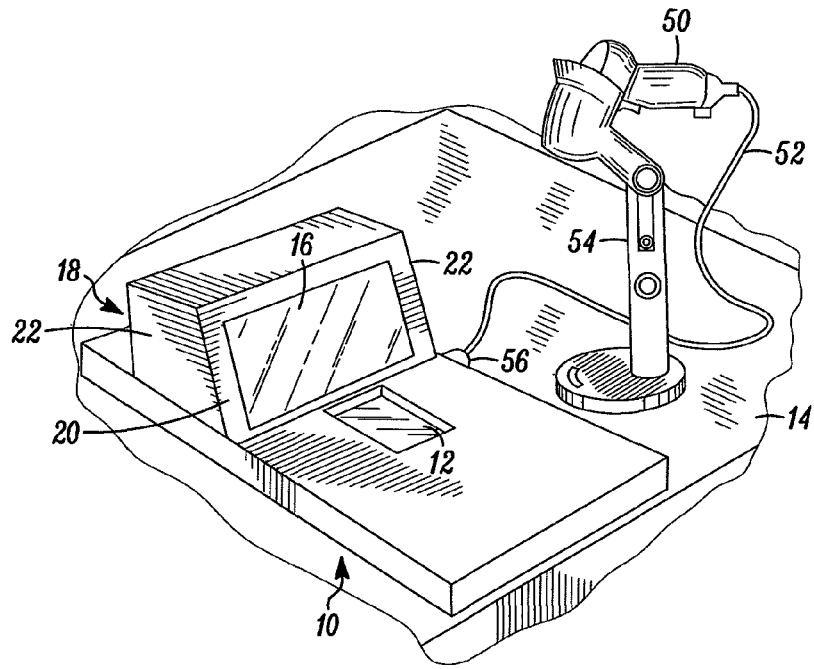
FIG. 1 is a broken-away, perspective view of a checkout system employing a dual window, bi-optical, point-of-transaction workstation, together with a corded reader, operative for reading indicia on products in accordance with the prior art.

FIG. 1 depicts a dual window, bi-optical, point-of-transaction workstation 10 in accordance with the prior art and used by retailers at a checkout stand to process transactions involving the purchase of products bearing identifying indicia or targets, such as the UPC symbols described above. The indicia can be printed on the products, or can be displayed on screens of such products as cellular telephones. Workstation 10 has a generally horizontal window 12 elevated, or set flush with, a generally horizontal support surface, such as a countertop 14 of the checkout stand, and a vertical or generally vertical, i.e., slightly rearwardly or forwardly tilted (referred to as "upright" hereinafter) window 16 set flush with, or recessed into, a generally upright or raised housing portion 18 above the countertop 14. Workstation 10 either rests directly on the countertop 14 as illustrated, or rests in a well formed in the countertop 14, or may be mounted on a movable support structure, such as a turntable, for rotation in either circumferential direction about a vertical axis perpendicular to the countertop 14. Raised housing portion 18 has a front wall 20 peripherally surrounding the upright window 16, and a pair of side walls 22, 22 at opposite lateral sides of the workstation 10.

Figure 2:
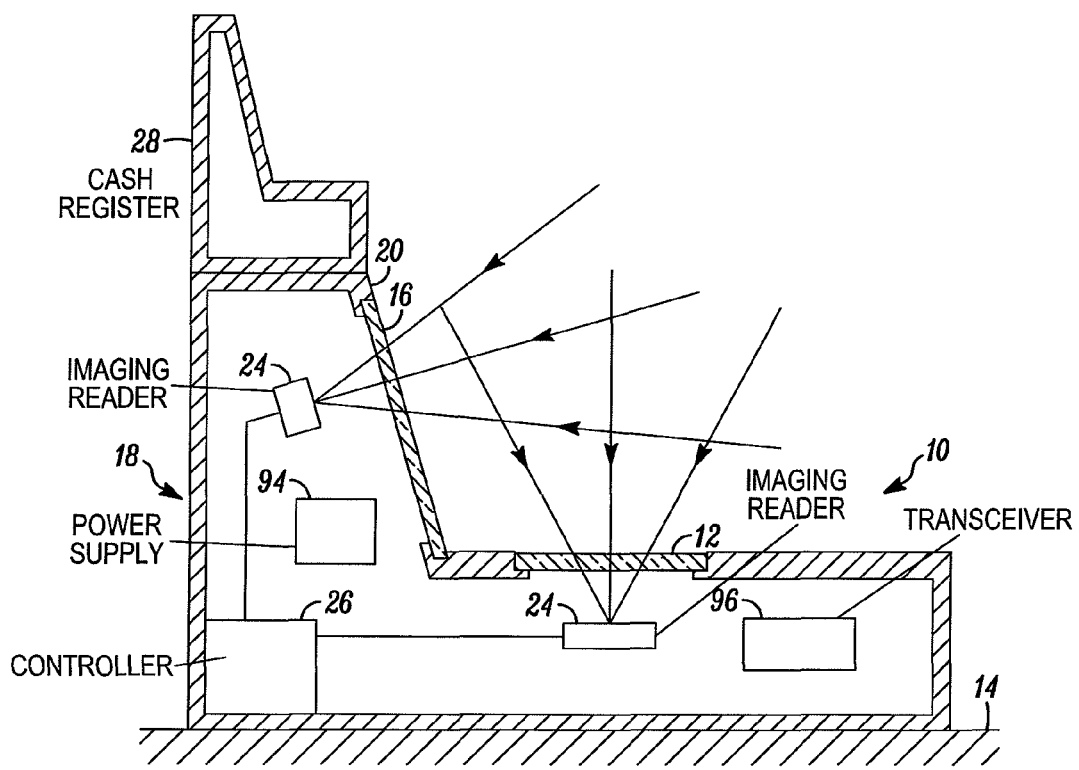
FIG. 2 is a part-sectional, part-diagrammatic, schematic view of a bi-optical workstation.

A main electro-optical reader is supported by the workstation 10 and is operative for electro-optically reading the indicia through at least one of the windows 12, 16. The main reader can be laser- and/or imager-based, as described above. An example of a laser-based reader is described below in connection with FIG. 3. An example of an imager-based reader is described below in connection with FIG. 4. As schematically shown in FIG. 2, the main reader in the workstation 10 advantageously includes a plurality of imaging readers 24, 24, one for each window 12, 16, for capturing light passing through either or both windows 12, 16 over intersecting fields of view from a target that can be a one- or two-dimensional symbol, such as a two-dimensional symbol on a driver's license, or any document. The imaging readers 24, 24 are operatively connected to a programmed microprocessor or controller 26 operative for controlling their operation. Preferably, the controller 26 is the same as the one used for decoding the return light scattered from the target and for processing the captured target images. To conserve space available on the countertop 14, a cash register 28 may be mounted on top of the raised housing portion 18.

In use, a clerk or a customer processes a product bearing a UPC symbol thereon past the windows 12, 16 by swiping the product across a respective window 12, 16, or by presenting the product by holding it momentarily steady at the respective window 12, 16. The symbol may be located on any of the top, bottom, right, left, front and rear, sides of the product, and at least one, if not more, of the imaging readers 24, 24 will capture the return light reflected, scattered, or otherwise returning from the symbol through one or both windows 12, 16.

As also shown in FIG. 1, the conventional workstation 10 is accompanied by a corded electro-optical reader 50, either laser-based or imager-based, to facilitate reading of large, heavy or bulky products that cannot be readily lifted into position facing at least one of the windows 12, 16. The corded reader 50 has its cord or cable 52 plugged directly into an auxiliary reader port 56 on the workstation 10. The corded reader 50 when not held in one's hand can be supported in a convenience stand 54 mounted on the countertop 14, or can be placed directly on the countertop 14, thereby wasting the space available on the countertop 14.

Figure 3:
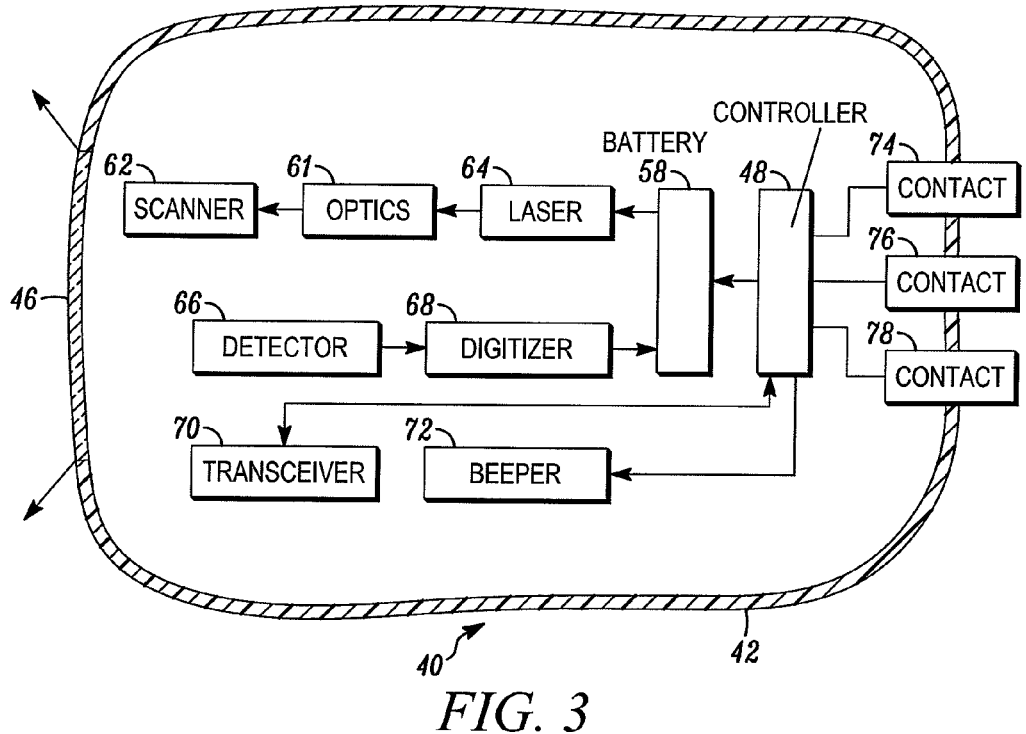
FIG. 3 is a part-sectional, part-diagrammatic, schematic view of a laser-based auxiliary cordless reader.
Figure 4:
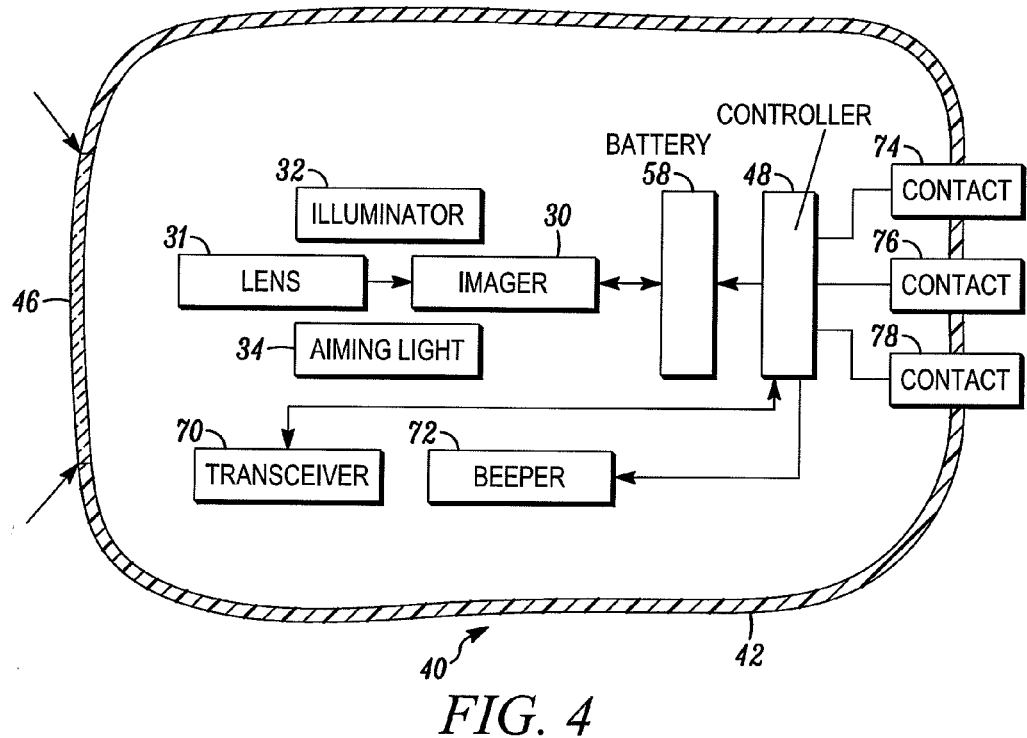
FIG. 4 is a part-sectional, part-diagrammatic, schematic view of an imager-based auxiliary cordless reader.

As described above, the corded reader's cable 52 typically gets in the way of the efficient handling of the products to be processed at the workstation, and therefore auxiliary cordless readers 40 of the type exemplified by FIGS. 3 and 4 are operated in a handheld mode. The cordless reader 40 is typically supported in a hands-free mode by a base station, analogous to the stand 54, mounted on the countertop 14, which again wastes the space available on the countertop 14.

FIG. 3 depicts a laser-based, auxiliary cordless reader 40 for electro-optically reading symbols, and includes a scanner 62 in a handheld housing 42 having a trigger 44 (see FIG. 5) for initiating reading. The scanner 62 is operative for scanning an outgoing laser beam from a laser 64 and/or a field of view of a light detector or photodiode 66 in a scan pattern, typically comprised of one or more scan lines, multiple times per second, for example, forty times per second, through a window 46 across the symbol for reflection or scattering therefrom as return light detected by the photodiode 66 during reading. The reader 40 also includes a focusing lens assembly or optics 61 for optically modifying the outgoing laser beam to have a large depth of field, and a digitizer 68 for converting an electrical analog signal generated by the detector 66 from the return light into a digital signal for subsequent decoding by a microprocessor or controller 48 into data indicative of the symbol being read. An on-board rechargeable battery 58 powers all the electrical components in the reader 40, and is recharged, as described below. An on-board wireless radio transceiver 70 sends and receives radio signals to a corresponding radio transceiver in the workstation 10, as described below. A beeper 72 broadcasts auditory alarms, also as described below. The controller 48 controls operation of all the electrical components in the reader 40 and is electrically connected to electrical contacts 74, 76, 78 that extend externally of the housing 42.

With like numerals identifying like parts, FIG. 4 depicts an imager-based, auxiliary cordless reader 40 for imaging targets, such as indicia or symbols to be electro-optically read, as well as non-symbols, and includes a one- or two-dimensional, solid-state imager 30, preferably a CCD or a CMOS array, mounted in the handheld housing 42 on which the trigger 44 for initiating reading is mounted. The imager 30 has an array of image sensors operative, together with an imaging lens assembly 31, for capturing return light reflected and/or scattered from the target through the window 46 during the imaging to produce an electrical signal indicative of a captured image for subsequent decoding by the controller 48 into data indicative of the symbol being read, or into a picture of the target. The imager-based reader 40 also includes an on-board rechargeable battery 58, an on-board wireless radio transceiver 70, and a beeper 72, as described above. The housing 42 has external electrical contacts 74, 76, 78, as described above.

When the imager-based reader 40 is operated in low light or dark ambient environments, an illuminator 32 is operative for illuminating the target during the imaging with illumination light directed from an illumination light source through the window 46. Thus, the return light may be derived from the illumination light and/or ambient light. The illumination light source comprises one or more light emitting diodes (LEDs). An aiming light generator 34 including an aiming laser may also be provided for projecting an aiming light pattern or mark on the target prior to imaging.

In operation of the imager-based reader 40, the controller 48 sends command signals to drive the aiming laser 34 to project the aiming pattern on the target prior to reading, and then to drive the illuminator LEDs 32 for a short time period, say 500 microseconds or less, and to energize the imager 30 during an exposure time period of a frame to collect light from the target during said time period. A typical array needs about 16-33 milliseconds to read the entire target image and operates at a frame rate of about 15-30 frames per second. The array may have on the order of one million addressable image sensors.

Figure 5:
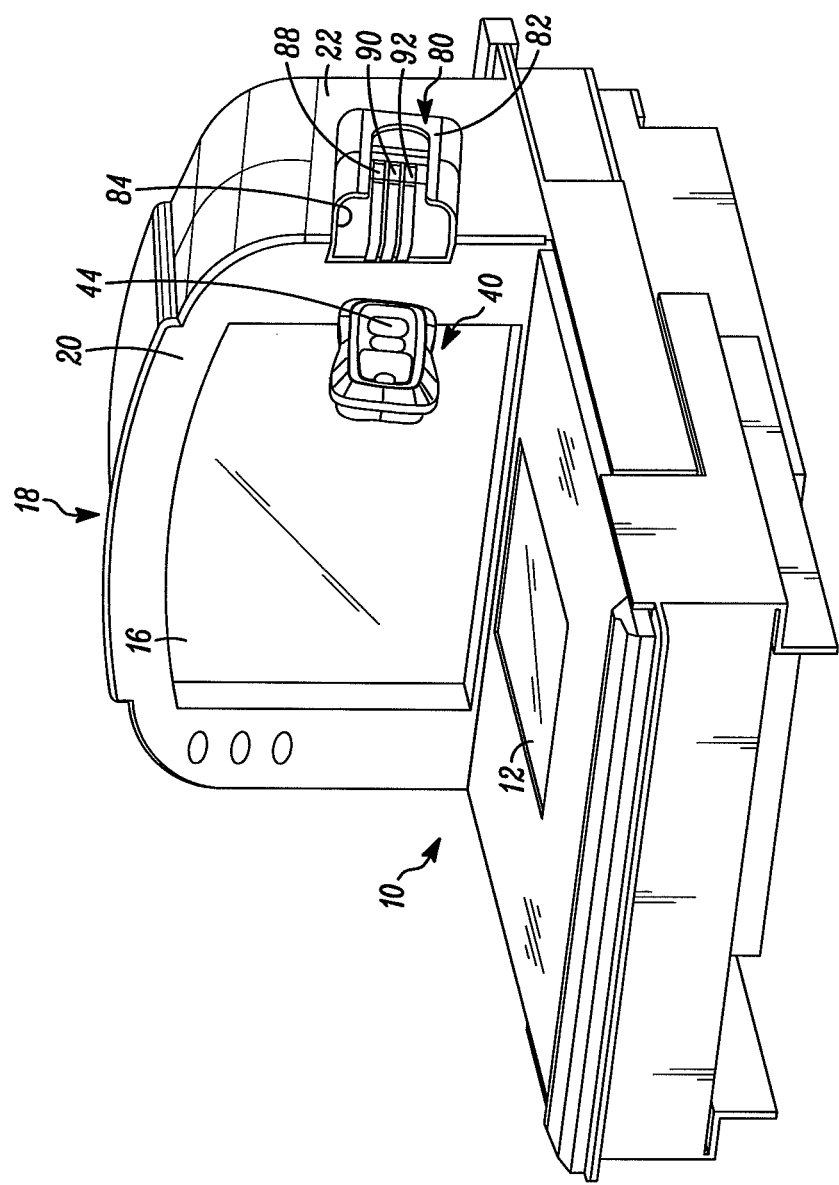
FIG. 5 is a perspective view of a bi-optical workstation with a zero-footprint cradle in accordance with this invention, as well as the auxiliary cordless reader of either FIG. 3 or FIG. 4 shown remotely from the cradle.
Figure 6:
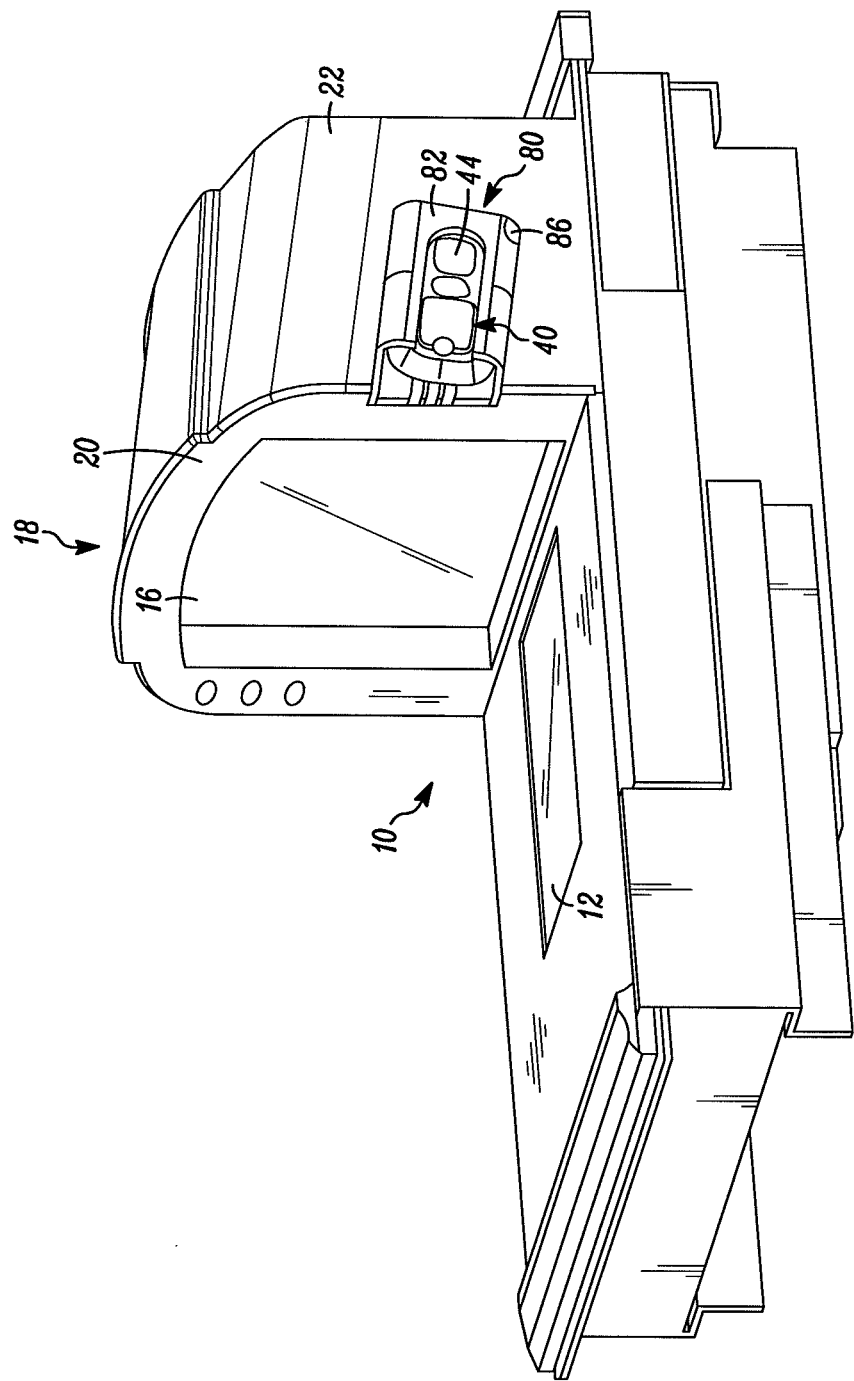
FIG. 6 is a view analogous to FIG. 5, but with the auxiliary cordless reader docked inside the cradle.

In accordance with this invention, as best seen in FIGS. 5-6, a cradle 80 for receiving the auxiliary cordless reader 40 is mounted on the raised housing portion 18 of the workstation. The cradle 80 has cradle walls 82 bounding a compartment in which the auxiliary cordless reader 40 is removably received when not in the handheld mode. The cradle 80 is supported by the raised housing portion 18 above and remote from, and out of direct contact with, the countertop 14 to form a zero-footprint therewith. Thus, the size of the footprint on the countertop 14 has been reduced to zero, which compares favorably to the relatively large footprint occupied by a conventional cordless reader with a base station resting on the countertop 14.

In the preferred embodiment, the cradle 80 does not extend forwardly of the front wall 20, or at least not to any appreciable extent, to prevent physical interference with products passing through the workstation 10. The cradle 80 has an open end 84 that opens onto the front wall 20 to facilitate ready insertion of the auxiliary cordless reader 40 into the cradle 80, as well as ready removal of the auxiliary cordless reader 40 from the cradle 80. The cradle 80 is integrally formed with the side wall 22, and is preferably injection-molded to be of one-piece construction therewith. The cradle 80 is inclined on the side wall 22 and has a weep hole 86 on the cradle 80 for fluid drainage located at a lowest elevation relative to the countertop 14. At food retailers, there is always the possibility that food or liquids will spill on the cordless reader 40 or the cradle 80. The weep hole enable spilled liquids to easily drain.

The controller 48 of the auxiliary cordless reader 40 electrically communicates with the workstation 10 through the side wall 22 via the multiple external electrical contacts 74, 76, 78 that mate with corresponding multiple electrical contacts 88, 90, 92 in the cradle 80. Advantageously, there is access to all the contacts so they can be cleaned without the need for any disassembly of the cradle. Ideally, the contacts within the cradle are located at an elevation above the weep hole 86 to keep liquids from settling on them. The internal rechargeable battery 58 and the electrical recharging contact 74 connect to the mating electrical recharging contact 88 in the cradle 80 when the auxiliary cordless reader 40 is received in the compartment. The workstation 10 has a power supply 94 (see FIG. 2) inside the workstation 10 for recharging the battery 58 in the auxiliary cordless reader 40 via the recharging contacts 74, 88. Hence, an external power supply, as described above in connection with the known base station, is not needed.

The sensor contact 76 connects to a mating sensor contact 90 in the cradle 80 when the auxiliary cordless reader 40 is received in the compartment. The controller 26 inside the workstation 10 detects the auxiliary cordless reader 40 in the cradle 80 via the sensor contacts 76, 90, for disabling the main reader 24, 24 when the auxiliary cordless reader 40 is not in the cradle 80, and for not enabling the main reader 24, 24 until the auxiliary cordless reader 40 is back in the cradle 80. Hence, this insures that the auxiliary cordless reader 40 will be returned to the cradle 80.

The controller 26 is further operative for generating an alarm if reading by the main reader 24, 24 is attempted without the auxiliary cordless reader 40 being back in the cradle 80. This further insures that the auxiliary cordless reader 40 will be returned to the cradle 80. The controller 26 is further operative for generating an alarm, for example a warning light, or an auditory warning from the beeper 72, if the auxiliary cordless reader 40 is moved beyond a predetermined distance away from the workstation 10. This prevents unauthorized travel of the auxiliary cordless reader 40 too far away from the workstation 10. In the event that the reader 40 becomes separated from the workstation 10, a button on the workstation 10 can be pressed, which will send a signal to the reader 40, causing the beeper 72 to emit an audible tone so that the reader 40 can be located. An electronic article surveillance (EAS) tag can be installed inside the reader 40 to sound an alarm from the beeper 72 if there is an attempt to remove the reader 40 from a store.

The data contact 78 connects to the mating data contact 92 in the cradle 80 when the auxiliary cordless reader 40 is received in the compartment. The controller 26 inside the workstation 10 is operative for downloading data corresponding to the indicia read by the auxiliary cordless reader 40 into a batch memory when the auxiliary cordless reader 40 is in the cradle 80, and for decoding the downloaded data. This batch data download can be used instead of transmitting the data between the wireless transceiver 70 in the auxiliary cordless reader 40 and a wireless transceiver 96 (see FIG. 2) in the workstation 10.

FIGS. 5-6 show a preferred location and orientation for the cradle 80, thereby making it unlikely for the auxiliary cordless reader 40 to be damaged by moving products, or accidentally knocked out of the cradle 80. Yet, the auxiliary cordless reader 40 is easy to access and can be readily extracted from the cradle 80 in any of several ways. For example, the user can reach down the side of the raised housing portion 18, manually grasp an exposed surface of the auxiliary cordless reader 40, and slide the reader 40 out from the cradle 80. Alternatively, a pop-out spring mechanism can be used, whereby the user pushes the reader 40 inwardly against a spring, and then releases the reader, thereby allowing the spring to push the reader 40 out from the cradle 80 to an extent sufficient for the reader to be grasped. Another option is to activate a solenoid by depressing a switch/button on the workstation 10, whereby an armature on the solenoid will push the reader 40 out from the cradle 80 sufficiently to be grasped.

It will be understood that each of the elements described above, or two or more together, also may find a useful application in other types of constructions differing from the types described above. For example, rather than using the imager-based readers 24, laser-based readers could be employed to replace one or all of the imager-based readers 24. Also, rather than mounting the cradle 80 at the side of a bi-optical workstation 10, the cradle could be mounted at the side of a vertical slot scanner that is placed on the countertop 14.

The transceivers 70, 96 can communicate via any number of radio technologies, such as Bluetooth. When a symbol is scanned by the reader 40, the decoded information from the symbol is transmitted to the workstation 10, and is than sent to a remote host, e.g., a computer in the cash register 28, just as would have happened if the main reader 24, 24 itself had scanned the symbol. The host therefore receives symbol data from either the main reader 24, 24 or the auxiliary reader 40 without any need to provide an additional input port, which may not be available in some installations.

Alternatively, the reader 40 can transmit the symbol data directly to the host via a WiFi radio, since many retailers already have WiFi radio systems installed. In this case, the auxiliary reader 40 will have to include, in the transmitted data, identification of the cash register lane in which it is being used, so that the scanned product can be charged to the correct customer. Another possibility is to have the reader 40 transmit directly to a compatible radio transceiver in the host to which it is associated.

Readers generally produce an audible beep whenever a symbol has been successfully read. The workstation 10 generally contains a large speaker to produce a loud beep, since the check-out area of a supermarket can be quite noisy. Producing a loud beep from the beeper 72 in the smaller cordless reader can be difficult. Hence, it is proposed to use the main speaker on the workstation 10 to produce the beep upon a successful decode. This has the further advantage that it prevents mix-ups of cordless readers 40, where one cordless reader might be accidentally placed in the cradle of the wrong workstation, for example in the workstation in a neighboring lane. If this mix-up went undetected, products scanned in the neighboring lane could be charged to the wrong customer. However, if the beep is produced by the workstation, and not by the cordless reader, it would be obvious that the beep is coming from the wrong lane, and the problem would be quickly eliminated. The beep frequencies that are produced when symbols are scanned by the workstation can be different from the frequency used when data from the cordless reader is received, to make it even more obvious that unexpected, inappropriate beeps have occurred.

When a workstation 10 with an integral cradle 80 is initially installed, the radio transceiver 70 in the cordless reader 40 and the radio transceiver 96 in the workstation 10 must be paired, so that the scanned data goes to the correct workstation. This can be done by having a permanent symbol on the cordless reader 40 that must be scanned by the workstation, or a permanent symbol on the workstation that must be scanned by the cordless reader 40. In some cases, it may be desirable to do both, allowing both the cordless reader 40 and the workstation 10 to identify themselves to each other.

The cradle 80 is ideally integrated into the housing of the workstation 10 such that the cradle 80 appears to be an integral part of the workstation 10. There should ideally be no exposed wires between the cradle 80 and the workstation 10, with the connections to the contacts protected from damage or from being accidentally unplugged. The cradle 80 can be either injection-molded as a single component with the rest of the raised housing portion 18 of the workstation 10, or can be mounted on the raised housing portion 18 in an integrated way, such as a snap-action mounting. In the latter case, since some users may not opt for the cordless reader 40, a cover can be made available for the opening or depression in the raised housing portion 18 where the cradle would have gone, if it were installed.

While the invention has been illustrated and described as embodied in a checkout terminal and method in which a bi-optical workstation is used, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

We claim:

1. A checkout system, comprising:
   a workstation supported by a support surface and operative for processing products bearing indicia, the workstation including a raised housing extending upwardly away from the support surface, a window supported by the workstation, and a main reader supported by the workstation for electro-optically reading the indicia through the window;
   an auxiliary cordless reader for electro-optically reading the indicia in a handheld mode when the main reader is not operated to read the indicia;
   a cradle supported by the raised housing above and remote from, and out of direct contact with, the support surface to form a zero-footprint therewith, the cradle bounding a compartment in which the auxiliary cordless reader is removably received when not in the handheld mode;
   wherein the workstation is configured as a bi-optical workstation, wherein the window is supported by the raised housing, and wherein the workstation includes another generally horizontal window through which the indicia is readable by the main reader;
   wherein the main reader in the workstation includes a plurality of imaging readers, one for each window, for capturing light passing through either or both windows over intersecting fields of view from the indicia;
   wherein the auxiliary cordless reader includes a laser-based reader for emitting a laser beam to the indicia, or a solid-state imager-based reader for capturing return light from the indicia; and wherein the auxiliary cordless reader includes a sensor contact for connection to a mating sensor contact in the cradle when the auxiliary cordless reader is received in the compartment; and wherein the workstation has a controller inside the workstation for detecting the auxiliary cordless reader in the cradle via the sensor contacts, for disabling the main reader when the auxiliary cordless reader is not in the cradle, and for not enabling the main reader until the auxiliary cordless reader is back in the cradle.

2. The system of claim 1, wherein the raised housing has a front wall surrounding the window, and wherein the cradle does not extend forwardly of the front wall.

3. The system of claim 1, wherein the raised housing has a front wall surrounding the window, and wherein the cradle has an open end opening onto the front wall.

4. The system of claim 1, wherein the raised housing has a side wall at a side of the workstation, and wherein the cradle is integrally formed with the side wall.

5. The system of claim 1, wherein the raised housing has a side wall at a side of the workstation, and wherein the cradle is inclined on the side wall and has a weep hole on the cradle for fluid drainage located at a lowest elevation relative to the support surface.

6. The system of claim 1, wherein the auxiliary cordless reader includes a rechargeable battery and an electrical recharging contact for connection to a mating electrical recharging contact in the cradle when the auxiliary cordless reader is received in the compartment, and wherein the workstation has a power supply inside the workstation for recharging the battery in the auxiliary cordless reader via the recharging contacts.

7. The system of claim 1, wherein the controller is further operative for generating an alarm if reading by the main reader is attempted without the auxiliary cordless reader being back in the cradle, or if the auxiliary cordless reader is moved beyond a predetermined distance away from the workstation.

8. The system of claim 1, wherein the auxiliary cordless reader includes a data contact for connection to a mating data contact in the cradle when the auxiliary cordless reader is received in the compartment; and wherein the workstation has a controller inside the workstation for downloading data corresponding to the indicia read by the auxiliary cordless reader when the auxiliary cordless reader is in the cradle, and for decoding the downloaded data.

9. A checkout method, comprising the steps of:
processing products bearing indicia through a workstation supported by a support surface;
configuring the workstation with a window and a raised housing extending upwardly away from the support surface;
electro-optically reading the indicia through the window by operating a main reader in the workstation;
electro-optically reading the indicia when the main reader is not operated by operating an auxiliary cordless reader in a handheld mode;
configuring a cradle to bound a compartment in which the auxiliary cordless reader is removably received when not in the handheld mode;
supporting the cradle by the raised housing above and remote from, and out of direct contact with, the support surface to form a zero-footprint therewith;
detecting the auxiliary cordless reader in the cradle via mating sensor contacts in the auxiliary cordless reader and the cradle when the auxiliary cordless reader is received in the compartment, disabling the main reader when the auxiliary cordless reader is not in the cradle, and not enabling the main reader until the auxiliary cordless reader is back in the cradle;
wherein the workstation is configured as a bi-optical workstation, wherein the window is supported by the raised housing, and wherein the workstation includes another generally horizontal window through which the indicia is readable by the main reader;
wherein the main reader in the workstation includes a plurality of imaging readers, one for each window, for capturing light passing through either or both windows over intersecting fields of view from the indicia; and
wherein the auxiliary cordless reader includes a laser-based reader for emitting a laser beam to the indicia, or a solid-state imager-based reader for capturing return light from the indicia.

10. The method of claim 9, and recharging a rechargeable battery in the auxiliary cordless reader from a power supply inside the workstation via mating recharging contacts in the auxiliary cordless reader and the cradle when the auxiliary cordless reader is received in the compartment.

11. The method of claim 9, and generating an alarm if reading by the main reader is attempted without the auxiliary cordless reader being back in the cradle.

12. The method of claim 9, and generating an alarm if the auxiliary cordless reader is moved beyond a predetermined distance away from the workstation.

13. The method of claim 9, and downloading data corresponding to the indicia read by the auxiliary cordless reader via mating data contacts in the auxiliary cordless reader and the cradle when the auxiliary cordless reader is in the cradle, and decoding the downloaded data.

14. The method of claim 9, wherein the steps of configuring and supporting the cradle are performed by molding the cradle to be of one-piece construction with the raised housing.

* * * * *